United States Patent [19]
Morton

[11] Patent Number: 5,639,580
[45] Date of Patent: Jun. 17, 1997

[54] REFLECTIVE INTEGRAL IMAGE ELEMENT

[75] Inventor: Roger Roy Adams Morton, Penfield, N.Y.

[73] Assignee: Eastman Kodak Company, Rochester, N.Y.

[21] Appl. No.: 600,712

[22] Filed: Feb. 13, 1996

[51] Int. Cl.⁶ .................. G03C 9/00; G03C 9/08; G03C 11/08; G03C 1/76
[52] U.S. Cl. .................. 430/11; 430/14; 430/403; 430/496; 430/946; 430/950; 359/463
[58] Field of Search .................. 430/946, 950, 430/11, 14, 403, 496; 359/463

[56] References Cited

U.S. PATENT DOCUMENTS

| | | | |
|---|---|---|---|
| 1,817,963 | 8/1931 | Capstaff . | |
| 1,918,705 | 7/1933 | Ives . | |
| 2,002,090 | 5/1935 | Ives . | |
| 2,039,648 | 5/1936 | Ives .................. | 95/18 |
| 2,499,453 | 3/1950 | Bonnet .................. | 88/1 |
| 2,500,511 | 3/1950 | Bonnet .................. | 88/1 |
| 2,785,976 | 3/1957 | Ogle .................. | 96/81 |
| 3,751,258 | 8/1973 | Howe et al. .................. | 96/81 |
| 4,190,321 | 2/1980 | Dorer et al. .................. | 350/165 |
| 4,252,843 | 2/1981 | Dorer et al. .................. | 427/162 |
| 4,618,552 | 10/1986 | Tanaka et al. . | |
| 4,629,667 | 12/1986 | Kistner .................. | 430/946 |
| 5,246,823 | 9/1993 | Shuman .................. | 430/510 |
| 5,349,419 | 9/1994 | Taguchi et al. .................. | 355/22 |
| 5,359,454 | 10/1994 | Steenblik et al. .................. | 359/463 |

FOREIGN PATENT DOCUMENTS

| | | |
|---|---|---|
| J51056 225 | 5/1976 | Japan . |
| 4 097 345 | 5/1992 | Japan . |
| 492 186 | 9/1938 | United Kingdom . |

*Primary Examiner*—Richard L. Schilling
*Attorney, Agent, or Firm*—Gordon M. Stewart

[57] ABSTRACT

An integral image element, comprising:
  an integral lens sheet with opposed front and back surfaces, the front surface carrying convex surfaces of a plurality of lens elements;
  an integral image positioned behind the back surface; and
  a non-specular reflective layer positioned behind the integral image which layer reflects more than 80% of visible light reaching the reflective layer from in front of the layer, before penetrating the reflective layer a distance of 10 microns.

A method of making the foregoing type of integral image element is also provided.

19 Claims, 5 Drawing Sheets

REFLECTIVE INTEGRAL IMAGE ELEMENT

FIELD OF THE INVENTION

The invention relates generally to the field of integral image elements which may display depth, motion or other images, and methods of making such elements.

BACKGROUND OF THE INVENTION

Integral image elements which use a lenticular lens sheet or a fly's eye lens sheet, and a three-dimensional integral image aligned with the sheet, so that a user can view the three-dimensional image without any special glasses or other equipment, are known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following Unites States patents: U.S. Pat. No. 5,391,254; U.S. Pat. No. 5,424,533; U.S. Pat. No. 5,241,608; U.S. Pat. No. 5,455,689; U.S. Pat. No. 5,276,478; U.S. Pat. No. 5,391,254; U.S. Pat. No. 5,424,533 and others; as well as allowed U.S. patent application Ser. No. 07/931,744. Integral image elements with lenticular lens sheets use interlaced vertical image slices which, in the case of a three-dimensional integral image, are aligned with the lenticules so that a three-dimensional image is viewable when the lenticules are vertically oriented with respect to a viewer's eyes. Similar integral image elements, such as described in U.S. Pat. No. 3,268,238 and U.S. Pat. No. 3,538,632, can be used to convey a number of individual two-dimensional scenes (such as unrelated scenes or a sequence of scenes depicting motion rather than one or more three-dimensional images.

Integral image elements using reflective layers behind the integral image to enhance viewing of the integral image by reflected light, are also described in U.S. Pat. No. 3,751,258, U.S. Pat. No. 2,500,511, U.S. Pat. No. 2,039,648, U.S. Pat. No. 1,918,705 and GB 492,186. While various types of reflecting layers are described in the foregoing, none of those references attaches any particular importance to the characteristics of the reflective layer nor suggests how such characteristics might affect image quality seen by a viewer.

Also, previous lenticular imaging methods typically used a method for exposing the images through the lenticular material. This causes flair because multiple views must be exposed and each view introduces a background flair into the overall scene due to light scatter from the lenticular material. Resolution is also lost because the lenticular material does not have as high an optical resolution as is necessary for high quality imaging and as a consequence resolution is lost during the exposure of the image. In U.S. Pat. No. 5,276,478 a method is described where the light sensitive layer is exposed with light from behind the back surface rather than through the lenticular lens sheet. However, undesirable halation problems with subsequent reduction in image quality, could be caused by light which passes through the light sensitive layer and is reflected back to it from the front surface of the lens sheet.

Japanese published patent application JP 4097345 describes the use of an anti-reflection layer on the surface of the lenticules as well as an anti-halation or anti-reflection layer on opposite side from the lenticules. However, the light sensitive layer is exposed through the lenticules. The lenticule side anti-reflective layer appears intended to reduce scattering of light from the lenticule side during that type of exposure. The opposite side anti-halation layer uses dyes which are removed by processing solutions which must pass through the light sensitive emulsion layer to effect dye removal. U.S. Pat. No. 1,817,963 describes a color photography technique using a dye on lenticules. However, the color "film" is intended for exposure in a camera with the lenticules facing the lens.

It would be desirable then, to provide an integral image element for viewing by reflective light, which has a reflective layer of defined properties which allows the image to be readily viewed while still maintaining good image quality perceived by the viewer. It would also be desirable in making such an element, to produce a high quality integral image element by using a method of exposing a light sensitive layer on the back side of an integral lens sheet from behind the light sensitive layer so as to produce low flair and high resolution, which method also results in low halation. It would also be desirable for many applications, to provide an integral image element with good contrast of the image being viewed.

SUMMARY OF THE INVENTION

The present invention realizes that in an integral image element for viewing by reflective visible light, the image quality will be determined at least in part by the type of reflective layer used. If a specular reflective layer is used, this would result in an image where only a portion can be readily viewed when the element is at a single correct angle between a visible light source and a viewer's eyes when specular or point source illumination is used. If a non-specular reflective layer is used this can allow a wider range of acceptable viewing angles between the visible light source and a viewer's eyes. However, the present invention further recognizes that during viewing, portions of a given visible light ray from a visible light source may penetrate the reflective layer different distances before being reflected. This leads to multiple reflections from the single ray, which reflections can then pass through different portions of the integral image before being perceived by a viewer. These multiple images will be perceived as a blurriness or reduced resolution in the image features. In result, this phenomena is somewhat analogous to the halation effect occurring during exposure of a photographic film, and may be referenced as a "viewed halation". Such a viewed halation effect is particularly important in an integral image element versus a conventional two-dimensional picture, since in the case of an integral image resolution of each thin image slice must be high to provide a visually acceptable image. The present invention therefore provides a reflective layer of specific characteristics to limit such viewed halation.

The present invention provides, in one aspect, an integral image element, comprising:

an integral lens sheet with opposed front and back surfaces, the front surface carrying convex surfaces of a plurality of lens elements;

an integral image positioned behind the back surface; and a non-specular reflective layer positioned behind the integral image which layer reflects more than 80% of visible light reaching the reflective layer from in front of the layer, before penetrating the reflective layer a distance of 10 microns.

In a second aspect, the present invention further provides a method of making such an element by exposing an integral imaging element having: an integral lens sheet with opposed front and back surfaces, the front surface carrying convex surfaces of a plurality of lens elements; and a light sensitive layer positioned behind the back surface;

the method comprising the steps of:

exposing the light sensitive layer with light from behind the back surface;

processing the light sensitive layer to fix any image from exposure; and covering the processed light sensitive layer with a non-specular reflective layer positioned behind the integral image which layer reflects more than 80% of visible light reaching the reflective layer from in front of the layer, before penetrating the reflective layer a distance of 10 microns.

The integral image element of the present invention allows the image to be readily viewed while still maintaining good image quality perceived by the viewer. The method of making such an element allows production of a high quality integral image element with low flair and high resolution, and low halation.

BRIEF DESCRIPTION OF THE DRAWINGS

To facilitate understanding, identical reference numerals have been used, where possible, to designate identical elements that are common to the figures.

EMBODIMENTS OF THE INVENTION

It will be appreciated in the present invention, that while the integral lens sheet could be a fly's eye lens sheet it is more preferably a lenticular lens sheet. Further, by an "integral" image is referenced an image composed of segments (lines, in the case of a lenticular lens sheet) from at least one complete image (and often more than one image), which segments are aligned with respective individual lenses so that each of the one or more images is viewable when a user's eyes are at the correct angle relative to the imaging element. An "integral imaging element" in the present case is used to refer to a element which, when properly exposed and processed (as may be necessary), can produce an integral image element. By "light" in the present application, except where otherwise indicated, is meant to include visible light, as well as infrared and ultraviolet light. By a light absorbing material is referenced a material which, at a minimum, absorbs at least one wavelength of the exposing light better than the antihalation layer and better than air. A preferred light absorbing material will be a black colored, non-reflective material.

While the present invention requires that more than 80% of the light be reflected before penetrating a distance of 10 microns. advantageously this can be more than 80% reflected before penetrating a distance of 8 microns or even 5 microns.

Figure 1:
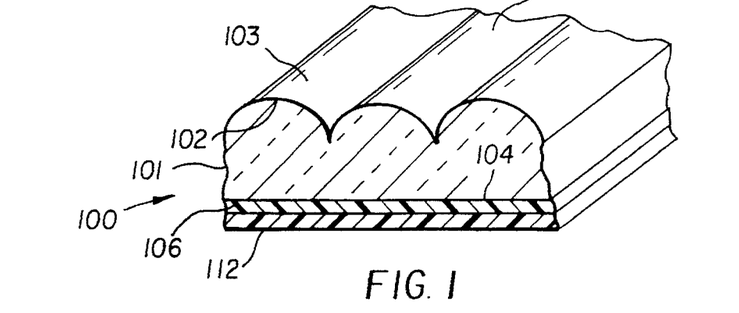
FIG. 1 is a cross-section illustrating an integral imaging element of the present invention.
Figure 2:
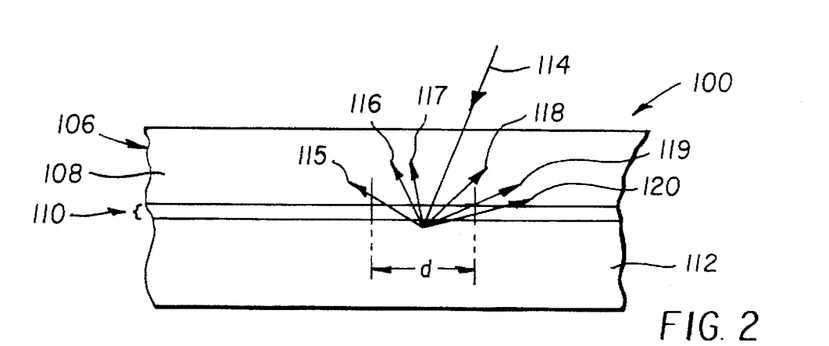
FIG. 2 is an enlarged view of a portion of FIG. 1 illustrating the viewing halation.

Referring now to FIGS. 1 and 2, an integral imaging element 100 is shown which has an integral lens sheet 101 with opposed front and back surfaces 102, 104 respectively. Sheet 101 is of conventional construction with front surface 102 carrying the convex surfaces of a plurality of identical, elongated and adjacent partially cylindrical lens elements 103, while opposed back surface 104 is flat.

An integral image carrying layer in the form of an exposed and processed photographic film 106, is positioned behind back surface 104. The integral image is carried in dye carrying layers 110 of film 106, while a transport film support 108 is directly attached to back side 104. A reflective layer 112 is positioned behind the integral image by being attached over dye carrying layers 110. Reflective layer 112 is a non-specular reflective layer which layer reflects more than 80% of visible light reaching the reflective layer from in front of the layer, before penetrating the reflective layer a distance of 10 microns. Suitable materials, preferably non-metallic, can be chosen for reflective layer 112. For example, suitable titanium dioxide pigment layers or other paint layers, can be chosen. Layers which will meet the foregoing defined reflectivity properties, can be easily ascertained by coating a 10 micron thick layer of a test layer on a clear substrate then directing visible light of a fixed intensity directly through the substrate and measuring if more than 80% of the visible light is reflected (or alternatively, measuring if less than 80% of the visible light is transmitted). Where more reflectivity is required from a tested layer, this can be obtained typically by increasing the concentration of reflective bodies (e.g. increasing titanium dioxide concentration in a carrier).

Suitable materials for the required reflective layer have been found to be titanium dioxide particles in a range smaller than the wavelength of light. Particularly, a reflective layer of Sherwin Williams KRYLON Glossy White 1501 spray paint works well when sprayed directly on the developed emulsion. Other paint formulations with sufficiently high concentrations of titanium dioxide or other suitable reflective materials in sub-mission particle sizes may be formulated to meet the required test. Alternatively, a metal or other highly reflecting surface whose profile is designed to provide diffuse reflection (for example, by etching) could be used. Reflective film bases such as used in KODAK DURAFLEX and KODAK ROYAL GOLD paper (containing titanium dioxide) have been found to not have the required reflectivity characteristics.

Figure 3:
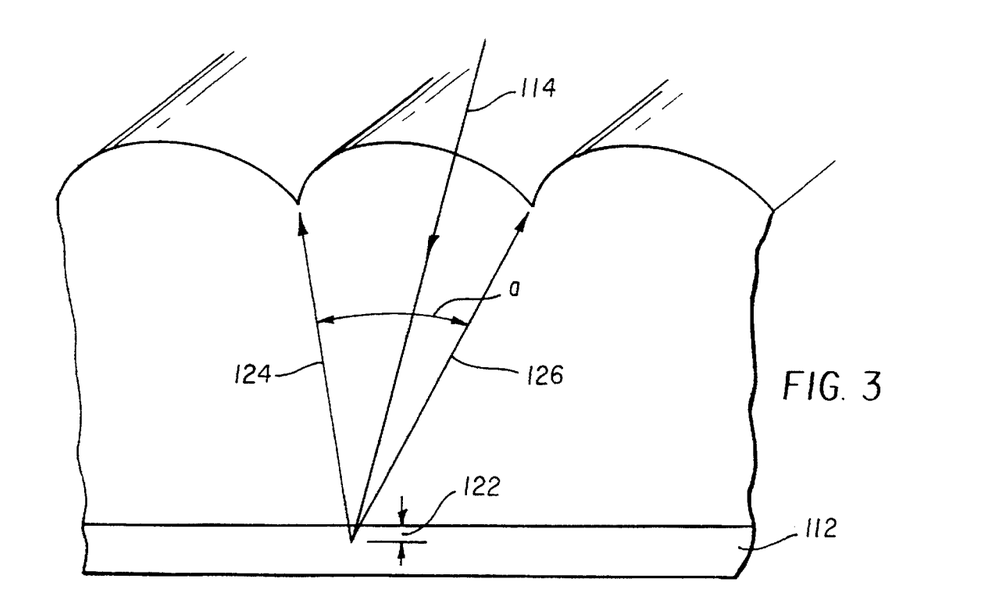
FIG. 3 is an enlarged view of a portion of FIG. 1 illustrating the relation of halation to the width of a lenticule.

The nature of reflective layer 112 is shown in magnified form in FIG. 2. Note that layer 112 can be of any thickness provided it meets the required reflectivity characteristics of the present invention. However, bearing in mind manufacturing considerations, layer 112 will typically have a thickness in the 50 to 125 micron range. During viewing conditions of the reflected image, a visible light beam 114 from a forward direction, penetrates through lenticular lens sheet 101, support 106 and the integral image in layers 110. Beam 114 then contacts reflective layer 112 and penetrates it a small distance 120 before being diffusely reflected in a variety of directions, including for example the directions shown by reflections 115, 116, 117, 118, 119, and 120, back into the image carrying layers 110. Because of the small penetration distance 122 of beam 114, the dispersion distance "d" over which the reflections 115 to 120 pass through the image remains small and ensures that edges in the image remain relatively sharp. Referring to FIG. 3, the reflected visible light rays which span across angle "a" between ray 124 and 126 will have a displacement d of less than 2Ktan(a/2) where "a" is the angle between the rays 124 and 126 and K is the penetration distance 122. If 80% of the visible light in a visible light beam 114 is reflected before penetrating 10 microns (approximately one-half of a thousandth of an inch) or less, this will ensure low blurriness of any edges in the image.

Figure 10:
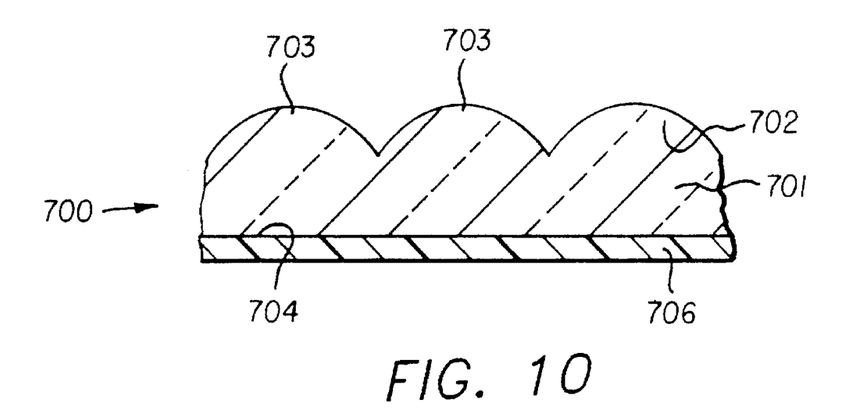
FIG. 10 is a cross-section illustrating still another method of making an integral image element of the present invention.
Figure 11:
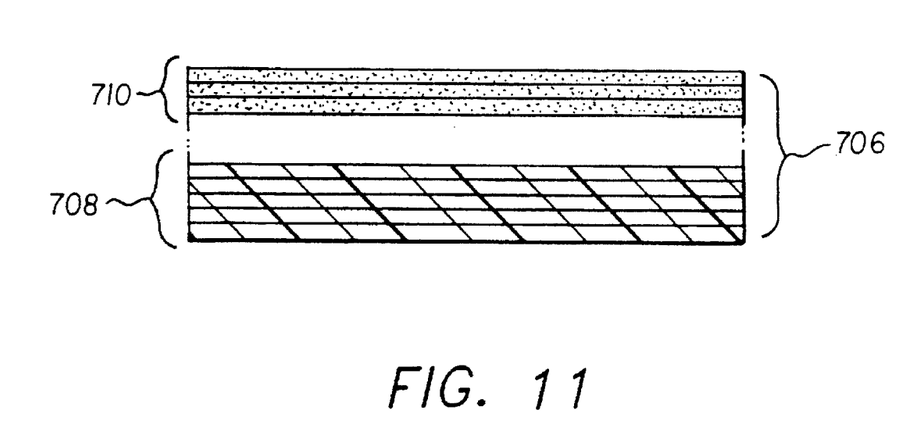
FIG. 11 is an enlarged view of a portion of FIG. 10.

Methods of making an integral image product of the present invention, such as that shown in FIGS. 1–3, will now be described. Any of the below described methods can be used providing a reflective layer is positioned behind the integral image (preferably as close as possible thereto, such as immediately adjacent the photographic layers of a photographic film attached to an integral lens sheet). The reflective layer must, of course, exhibit the above described characteristics (a non-specular reflective layer which layer reflects more than 80% of the visible light reaching the reflective layer from in front before penetrating the reflective layer a distance of 10 microns). Generally, in the methods of FIGS. 4–9 some type of anti-halation layer is provided on the front surface of an integral lens sheet of an integral imaging element. In the method of FIGS. 10–12, some type of anti-halation layer is provided forward of an imaging layer of an integral imaging element.

Figure 4:
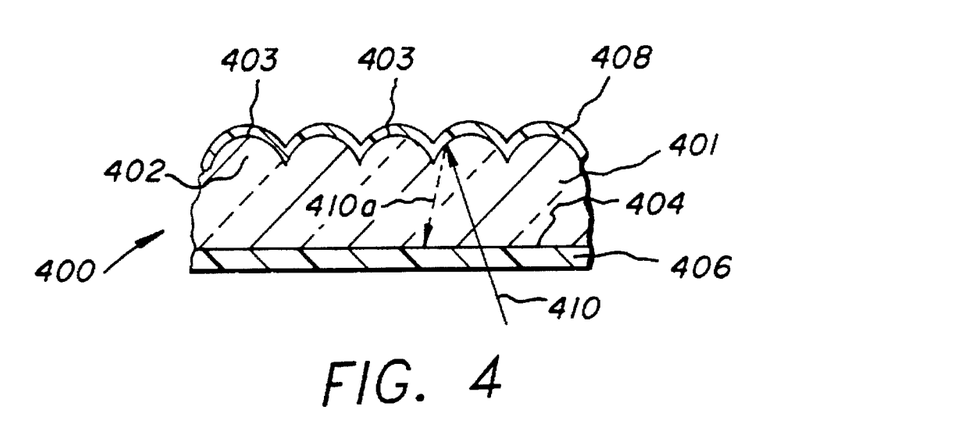
FIG. 4 is a cross-section illustrating a first method and system for making an integral image element of the present invention.

Referring now to FIG. 4, an integral imaging element 400 is shown which has an integral lens sheet 401 with opposed front and back surfaces 402, 404 respectively. Sheet 401 is of conventional construction with front surface 402 carrying the convex surfaces of a plurality of identical, elongated and adjacent partially cylindrical lens elements 403, while opposed back surface 404 is flat. A light sensitive layer 406, in the form of a conventional unexposed photographic emulsion, is positioned behind back surface 404, specifically by being directly attached to back surface 404. A thin emulsion layer 408, which acts as an anti-halation layer, covers front surface 402. Layer 408 is arranged to be black and highly light absorbing so that during exposure of light-sensitive layer 406 with light from behind the back surface, layer 408 will reduce the amount of exposing visible light which would otherwise be reflected back toward light sensitive layer 406 from front surface 402 absent layer 408. For example, if layer 408 was not present, during exposure with light from behind light-sensitive layer 406 a light ray 410 which passes through layer 406 and hits front surface 402, may be at least partially reflected back toward light sensitive layer 406 as indicated by reflection 410a (shown as a broken line). However, absorbing anti-halation layer 408 will absorb, at least partially, ray 410 and reduce or eliminate reflection 410a. This inhibits or prevents degradation of the image due to halation effects.

Once the material shown in FIG. 4 has been exposed to light it is processed using a photographic development process. Many suitable processes are known. In that process, any image in light sensitive layer 406 is developed and fixed in a permanent form in a manner well known in the photographic art. Light sensitive layer 406 thus becomes an image layer. Also, during that processing the absorption layer 408 becomes clear or alternatively or additionally, may also be washed off. This renders the final image element as a transparent lenticular image. To make an integral image element of the present invention, the layer 406 (now the image layer) can be covered with a reflective coating having the previously defined reflection characteristics placed immediately behind and adjacent layer 406.

Figure 5A:
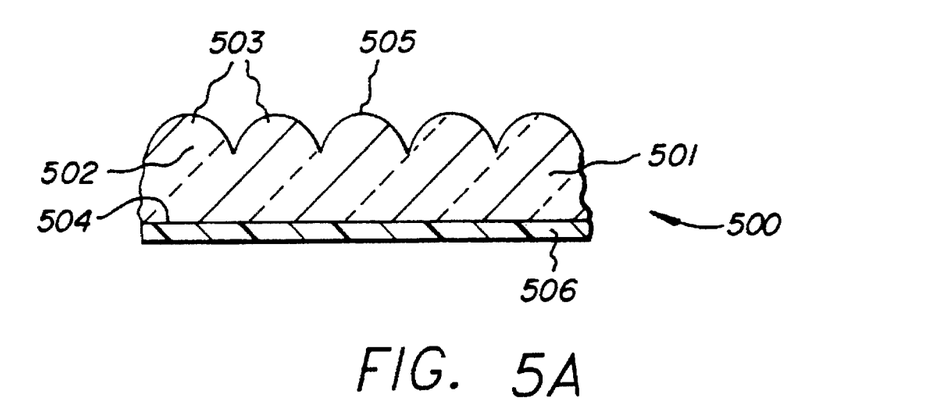
FIG. 5A is cross-sections similar to FIG. 4 but showing the use of a different integral imaging element.
Figure 5B:
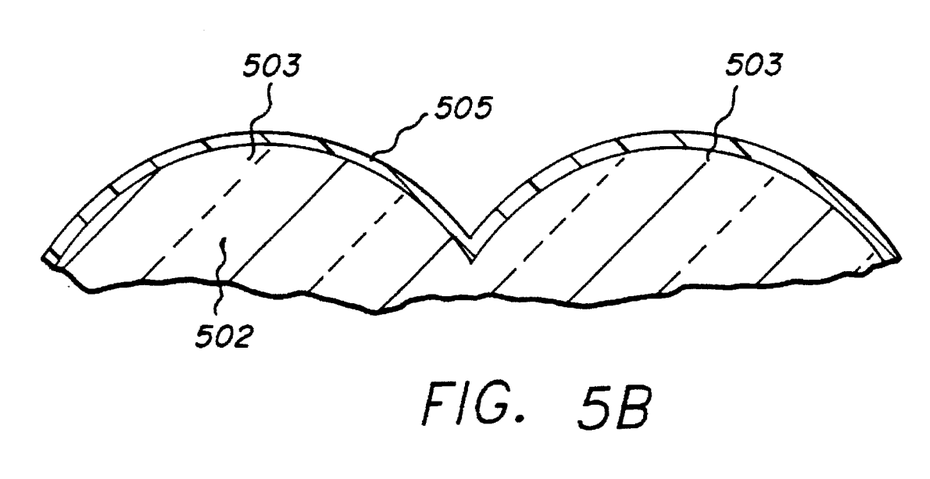
FIG. 5B is an enlarged view of a portion of FIG. 5A.

FIG. 5A again shows the construction of an integral imaging element 500 for use in a method and system for making an integral image element of the present invention. Imaging element 500 has a lenticular lens sheet 501 with a front surface 502 carrying a plurality of adjacent, parallel, partially cylindrical elongated lenticules 503, and an opposed flat back surface 504, all in a known manner. Back surface 504 carries a light sensitive layer 506, in the form of a conventional unexposed photographic emulsion, attached immediately adjacent to back surface 504. Imaging element 500 also has an anti-halation layer in the form of a moth's eye lens surface 505 immediately adjacent to, and covering completely, front surface 502. The magnified view of FIG. 2B shows the moth's eye lens surface 505 more clearly. A moth's eye lens is a textured surface pattern which is a regular pattern comprising an arrangement of grooves or protuberances. The pitch of the pattern is smaller than the shortest wavelength within a predetermined band of radiation to be absorbed by the lens, and the depth (peak-to-trough) of the pattern is at least 100 nm. The pattern is preferably free from undercutting so as to be suitable for production or replication by molding, casting or embossing. Such patterns are described in U.S. Pat. No. 4,866,696 and U.S. Pat. No. 4,616,237. In practice it is preferred that moth's eye lens surface 505 is applied by being embossed on the chill roll which formed the lenticular front surface 502 during the extrusion process or may be formed through an aluminum oxide application technique such as described in U.S. Pat. No. 4,190,321 and U.S. Pat. No. 4,252,843. Moth's eye lens surface 505 preferably has a reflection coefficient of less than one percent in air (measured over the visible light spectrum).

Figure 6:
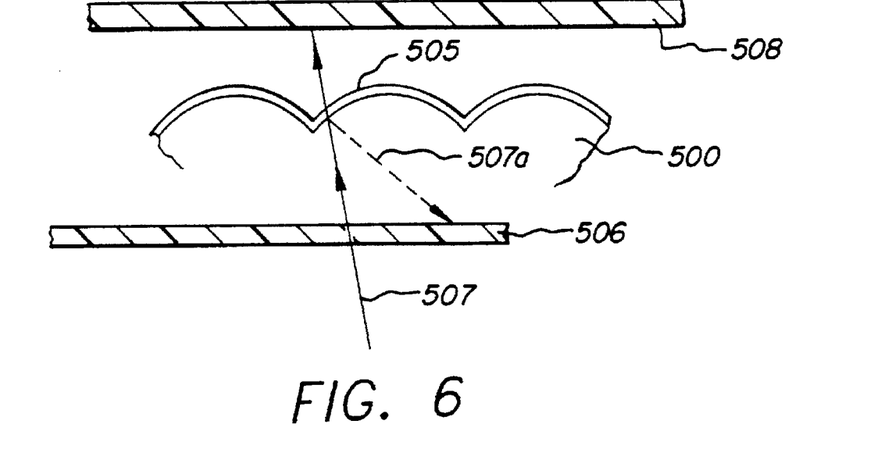
FIG. 6 is a cross-section illustrating a particular method and system for making an integral image element of the present invention using an integral imaging element of FIG. 5.

As shown in FIG. 6, imaging element 500 may be exposed with light from behind light sensitive layer 506. An exposure light ray 507 which passes through light sensitive layer 506 will tend to pass directly through the moth's eye surface. A highly light absorbing layer 508 can optionally be positioned forward of moth's eye lens surface 505 to safely absorb light of ray 507 which passes through moth's eye lens surface 505. Layer 508 can be made of any suitable light absorbing material but is preferably a black, non-reflective material.

Thus, it will be appreciated that moth's eye lens surface 505 reduces or eliminates the amount of exposing light which would otherwise be reflected back toward the light sensitive layer 506 from front surface 502 absent surface 505. For example, a reflection 507a which might otherwise result from a portion of ray 507 being reflected back to light sensitive layer 506 by front surface 502, is reduced in intensity or eliminated by the presence of moth's eye lens surface 505.

Figure 7:
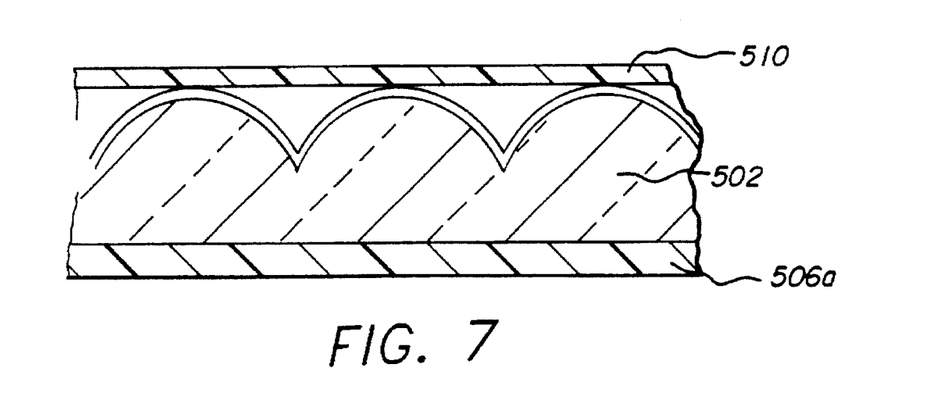
FIG. 7 is a cross-section illustrating the application of an overcoat on an integral image element produced from the method shown in FIG. 6.

An integral imaging element 500 may be processed, following exposure, in the same manner as already described in connection with integral imaging element 400 of FIG. 7. Light sensitive layer 506 then becomes image layer 506a such as shown in FIG. 7. However, moth's eye lens surface 505 will typically be of a material (such as an embossed layer on front surface 502, as described above) which is not removed by processing of the imaging element.

It is useful that moth's eye surface 505 remains after processing though, since the moth's eye lens effect also improves the contrast range when viewing the image either in reflection or in transmission.

The resulting image element (which will be an integral image element if the exposing light was from an integral image) will have an image viewable by transmission. If it is desired to have an image viewable by reflection as required by the present invention, the previously described reflective layer can be coated immediately adjacent and behind image layer 506a in a similar manner as discussed in connection with the image element produced using imaging element 400 of FIG. 4.

Figure 8:
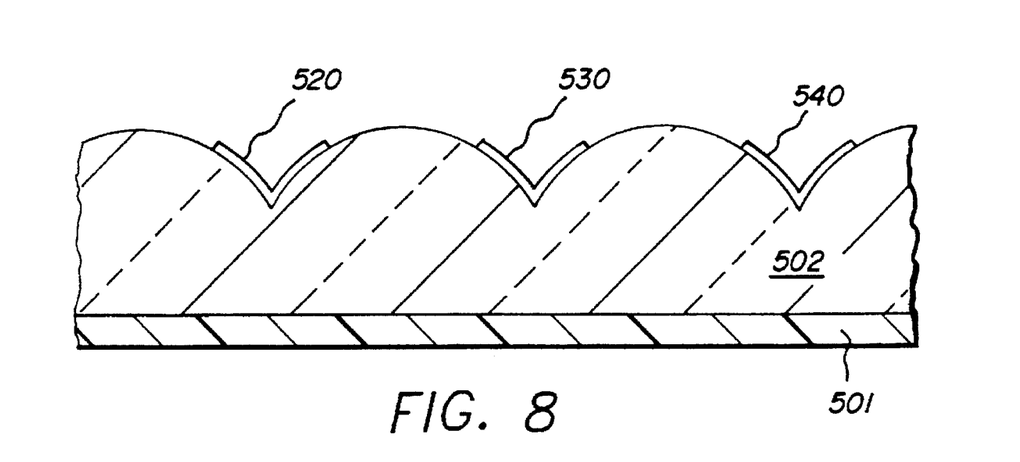
FIG. 8 is a cross-section similar to FIG. 6 but using a modified integral imaging element.

To overcome the fingerprinting problem of moth's eye surfaces a protective overcoat layer 510 may be placed above and in contact with the front surface 502 after imaging element 500 has been processed, as shown in FIG. 7. Alternatively, because fingerprints will primarily occur on the peaks of lenticules 503, moth's eye surface 505 may be limited to valley areas such as 520, 530, and 540, between all lenticules 503, as best shown in FIG. 8.

In another method for making an integral image element of the present invention, integral image quality is improved and halation again reduced during exposure. This method again uses a lenticular lens sheet as previously described in connection with FIGS. 1–5, and which has a light sensitive layer on the back surface. In this method an anti-halation layer covers the front surface of a lenticular lens sheet, which anti-halation layer more closely matches the refractive index of the material from which the lenticular lens sheet is made, than does air (the front surface previously typically being in contact with air during exposure of the light sensitive layer). Preferably this anti-halation layer has a refractive index which closely matches that of the material forming the lenticular lens sheet. A light absorbing material is preferably positioned forward of such an anti-halation layer during exposure of the light sensitive layer.

Figure 9:
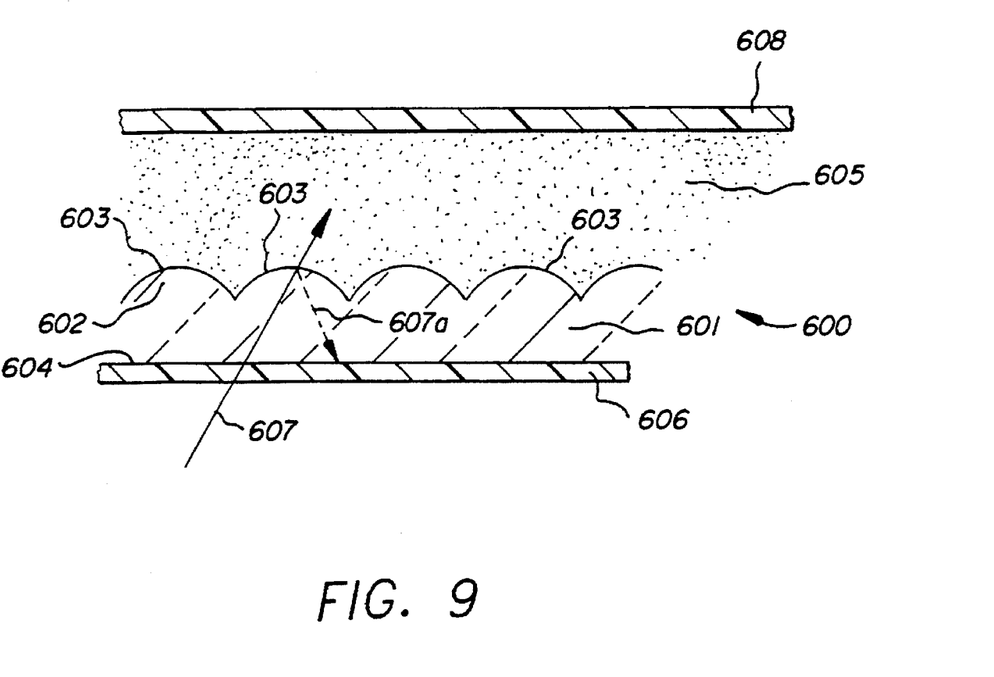
FIG. 9 is a cross-section illustrating a second method and system of making an integral image element of the present invention.

A system of the foregoing type is shown in FIG. 9. In FIG. 9 integral imaging element 600 has a lenticular lens sheet 601 with opposed front and back surfaces 602, 604 respectively. Front surface 602 carries convex surfaces of lenticules 603 while back surface 604 is flat. Integral imaging element 600 also includes a light sensitive layer 606 in the form of a conventional unexposed photographic emulsion. All of the foregoing elements may be constructed the same as in lenticular imaging element 500 of FIGS. 2A and 2B.

During exposure of integral imaging element 605 with light from behind light sensitive layer 606 (that is, from beneath layer 606 as shown in FIG. 9), an anti-halation layer 605 is in contact with and covers the entire front surface 602. Anti-halation layer 605 is preferably a liquid whose refractive index is closer to that of the material of lenticular lens sheet 601 than is air, and preferably closely matches the refractive index of the material of lens sheet 601. A solid material with the similar relative refractive index could be used instead of a liquid, but is less preferred since the liquid is very readily removed and can be readily re-used. The liquid of anti-halation layer 605 is bounded at a position forward of anti-halation layer 605 by a highly light absorbing (for example, black) layer 608.

Anti-halation layer 605 will act to reduce the amount of exposing light which would otherwise be reflected back toward light sensitive layer from front surface 602, during exposure of light sensitive layer 606 with light from behind layer 606. For example, in the absence of anti-halation layer 605 a light ray 607 which, during such exposure, passes through light sensitive layer 606 will tend to be at least partially reflected by front surface 602 (which would typically be in contact with air) as a reflection 607a. However, since anti-halation layer 605 has a refractive index closely matching that of the material of lenticular lens sheet 601, reflection 607a is eliminated or reduced in intensity over that which would be present absent anti-halation layer 605. Eventually ray 607 reaches highly light absorbing layer 608 where it is absorbed thereby preventing it being scattered back toward light sensitive layer 606.

After exposure of element 600, layer 608 is removed and the liquid of anti-halation layer 605 is washed off front surface 602 during the development process (which may be of a type already mentioned). Again, a reflective coating can be applied immediately adjacent and behind layer 606 (which is now an image layer), to obtain an image element of the present invention.

It will be appreciated that in the above methods, it is not necessary that the light sensitive layer be positioned directly adjacent the back side of a lenticular lens sheet. For example, the light sensitive layer could be attached to the back side of a transparent spacer, with the front side of the transparent spacer (that is, the side not coated with the light sensitive layer) being directly attached to the back side of the lenticular lens sheet. This arrangement allows one to assemble a lenticular imaging element by using a conventional photographic color film with its emulsion layers on a transparent base, by attaching the transparent base to the back side of a lenticular lens sheet. Further, it will be appreciated that each of the anti-halation layers shown can be much thinner than illustrated. The thickness can be selected bearing in mind the particular material being used and its desired properties.

Referring now to FIG. 10, an integral imaging element 700 is shown which has an integral lens sheet in the form of lenticular lens sheet. Lens sheet 701 has opposed front and back surfaces 702, 704 respectively. Lens sheet 701 is of conventional construction with front surface 702 carrying the convex surfaces of a plurality of identical, elongated and adjacent partially cylindrical lens elements 703, while opposed back surface 704 is flat. Lens sheet 701 is preferably of uniform composition, having been cast, extruded, chill-rolled or formed in some other manner from material of the same composition. Further, lens sheet 701 is preferably of unitary construction in that it is preferably not composed of laminated layers.

A photographic layer 706 is positioned behind back surface 704, specifically immediately adjacent to back surface 704, by being directly attached to it. Referring to FIG. 11, photographic layer 706 has both one or more light sensitive layers 708 and one or more anti-halation layers 710. Light sensitive layers 708 may or may not be separated by interlayers, and at least one of them (preferably all of them) is a conventional photographic light-sensitive silver halide emulsion in a gel (preferably a gelatin gel). One or more anti-halation layers 710 are interposed between the one or more light sensitive layers 708 and the back surface 704. For simplicity the following discussion will refer to a single light-sensitive layer 708 and a single anti-halation layer 710, but it will be understood that the discussion applies the same to more than one layer of either of them.

An anti-halation layer is selected so as to absorb light, preferably visible light. In the case where the anti-halation layer absorbs visible light, it will appear colored and should be selected so as to be readily decolored (for example, by decomposition or removal of the colored compound). Each anti-halation layer 710 may particularly be a gelatin gel layer containing a suitable anti-halation dye in a medium such as a gelatin gel. An anti-halation dye is typically colored to absorb light, such as visible light, but is typically decolorized or removed during processing of the element. Suitable anti-halation dyes are well known in the field of conventional photography.

The integral lens sheet 701 may be formed by any suitable method, such as by chill rolling. Layers 708 and 710 may then be coated on back surface 704 in the order shown. This procedure results in the integral imaging element 700 shown in FIGS. 10 and 11 with an antihalation layer 710 directly attached to the back surface 704 of lens sheet 701. However, the foregoing arrangement is not essential and anti-halation layer 710 can be separated from back surface 704 and from light-sensitive layer 708 by one or more interlayers (not shown). As another alternative, layers 708 and 710 could first be provided on a suitable support with layer 708 being closest to the support. By a "support" in this context, is meant a body of sufficient rigidity as to allow the combination of the layers 708, 710 and support to be manually handled while maintaining its integrity (that is, without falling apart and without significant stretching). This combination (layers 708, 710 and support) can together be a conventional photographic film (for example, a color film with different sensitivity silver halide emulsion layers acting as different color records). This conventional film could then have its base laminated to the back surface 704 of lenticular lens sheet 701. However, in the embodiment of FIGS. 10 and 11 there is no intervening support between the anti-halation layer and the back side of the lenticular lens sheet.

In the present invention, exposure of an integral imaging element, such as element 700, may be accomplished by a number of methods other than by scanning a light spot source. For example, a major portion of the area of the light sensitive layer 708 (such as an area of at least 1 cm$^2$ or even at least 5 cm$^2$), may be simultaneously exposed with light from behind light sensitive layer 708 (that is light from a direction beneath layer 708 as viewed in FIGS. 10 and 11). Also, the majority or all of the area of the light sensitive layer 708 could be simultaneously exposed with light from behind the light sensitive layer. Alternatively, any of the foregoing areas or some other some part less than all, or all, of the area of light sensitive layer 708 may be exposed simultaneously by exposing it to all of an integral image from behind the light sensitive layer. Such exposure could, for example, be accomplished by exposing the integral imaging element to light from an enlarger which has passed through, or been reflected from, an integral image. Such exposure could also be achieved by contact printing the integral imaging element using an integral image master. During exposure of light-sensitive layer 708 with light from behind it, layer 710 will reduce the amount of exposing light which might otherwise be reflected back toward light sensitive layer 708 from back surface 704 absent layer 710.

Following exposure, integral imaging element 700 is processed to develop and fix any image in light sensitive layer 708 as may be required depending on the constitution of layer 708. In the processing, any image is fixed to an unalterable form if it was not already so. Preferably during this processing (although it could be in a separate step), anti-halation layer 710 is decolorized when it is of a constitution that it absorbs visible light. Where light sensitive layer 708 is a light-sensitive silver halide, any of many known methods of silver halide photographic processing can be used The resulting final element will be a lenticular element. If exposure was with an integral image, then the final element will be an integral image element. In either event, the element will be transparent. For protection, layer 708 could be overcoated with any suitable transparent layer (not shown). To produce an integral image element of the present invention, layer 708 (now an image layer) is covered with a non-specular reflective coating (not shown), having the reflection characteristics previously defined in connection with the present invention, placed immediately behind and adjacent layer 708.

As previously mentioned, exposing any of the integral imaging elements previously described, from behind with a light pattern which represents an integral image, processing the exposed element (as may be required) to produces a visible integral image, and adding a reflective layer of the above defined characteristics, results in an integral image element of the present invention. The formation of suitable integral images by interlacing lines from different scenes, and their exposing or writing to the back side of integral imaging elements, is described for example, in U.S. Pat. No. 5,278,608, U.S. Pat. No. 5,276,478 and U.S. Pat. No. 5,455,689. The integral image can, for example, be made of two or more images of a scene taken at different perspectives (that is, at different angular positions with respect to the scene). Such an integral image, when recorded on the light sensitive layer and viewed from a position forward of the front side of the lenticular lens sheet, may provide one or more three-dimensional images. By a "three-dimensional image", is meant an integral image which, when viewed through the front side of the lens sheet (that is viewed through the lens elements), has a visible depth element as a result of the various views being relationally configured to appear as the views that would be seen from different positions when actually viewing a three-dimensional object. A depth element means the ability to at least partially look around an object in the scene. This can be obtained by interlacing lines from different perspective views of the same scene, in a known manner. Thus, a three-dimensional image necessarily includes at least two views of a scene. These views are typically arranged to be viewable when the lenticules of the element are positioned vertically with respect to a plane of sight of a user's eyes. Alternatively or additionally, the integral image may contain one or more two-dimensional images which may be recorded in alignment with the lens sheet so as to be viewable when the lenticules are positioned horizontally or vertically with respect to the plane of sight of a user's eyes.

The invention has been described with reference to a preferred embodiment. However, it will be appreciated that variations and modifications can be effected by a person of ordinary skill in the art without departing from the scope of the invention.

| PARTS LIST | |
| --- | --- |
| 100 | Element |
| 101 | Lens Sheet |
| 102 | Front Surface |
| 103 | Cylinder Lens Elements |
| 104 | Back Surface |
| 106 | Photographic Film |
| 108 | Film Support |
| 110 | Layers |
| 112 | Reflective Layer |
| 114 | Beam |
| 115 to 120 | Reflections |
| 122 | Distance |
| 124 and 126 | Rays |

-continued

PARTS LIST

| | |
|---|---|
| 400 | Imaging Element |
| 401 | Lens Sheet |
| 402 | Front Surface |
| 403 | Lens Elements |
| 404 | Back Surface |
| 406 | Light Sensitive Layer |
| 408 | Absorption Layer |
| 410 | Light Ray |
| 410a | Reflection |
| 500 | Imaging Element |
| 501 | Lens Sheet |
| 502 | Front Surface |
| 503 | Lenticules |
| 504 | Back Surface |
| 505 | Moth's Eye Lens Surface |
| 506 | Light Sensitive Layer |
| 506a | Image Layer |
| 507 | Light Ray |
| 507a | Reflection |
| 508 | Light Absorbing Layer |
| 510 | Protective Overcoat Layer |
| 520 | Valley Area |
| 530 | Valley Area |
| 540 | Valley Area |
| 600 | Imaging Element |
| 601 | Lens Sheet |
| 602 | Front Surface |
| 603 | Lenticules |
| 604 | Back Surface |
| 605 | Anti-Halation Layer |
| 606 | Layer |
| 607 | Light Ray |
| 607a | Reflection |
| 608 | Light Absorbing Layer |
| 700 | Imaging Element |
| 701 | Lens Sheet |
| 702 | Front Surface |
| 703 | Lens Elements |
| 704 | Back Surface |
| 706 | Photographic Layer |
| 708 | Light Sensitive Layer |
| 710 | Anti-Halation Layer |

I claim:

1. An integral image element, comprising:
   an integral lens sheet with opposed front and back surfaces, the front surface carrying convex surfaces of a plurality of lens elements;
   an integral image positioned behind the back surface; and
   a non-specular reflective layer positioned behind the integral image which layer reflects more than 80% of visible light reaching the reflective layer from in front of the layer, before penetrating the reflective layer a distance of 8 microns.

2. An integral image element according to claim 1 wherein the integral lens sheet is a lenticular lens sheet with lenticules on the front surface.

3. An integral image element according to claim 2 wherein the reflective layer is positioned immediately adjacent the integral image.

4. An integral image element according to claim 1 wherein the reflective layer is a non-metallic layer.

5. An integral image element according to claim 1 wherein the integral image is a depth image.

6. A method of exposing an integral imaging element having: an integral lens sheet with opposed front and back surfaces, the front surface carrying convex surfaces of a plurality of lens elements; and a light sensitive layer positioned behind the back surface;
   the method comprising the steps of:
   exposing the light sensitive layer with light from behind the back surface;
   processing the light sensitive layer to fix any image from exposure; and
   covering the processed light sensitive layer with a non-specular reflective layer positioned behind the integral image which layer reflects more than 80% of the visible light reaching the reflective layer from in front before penetrating the reflective layer a distance of 8 microns.

7. A method according to claim 6 wherein the integral lens sheet is a lenticular lens sheet with lenticules on the front surface.

8. A method according to claim 7 wherein the refelective layer is positioned immediately adjacent the integral image.

9. A method according to claim 8 wherein the reflective layer is a non-metallic layer.

10. A method according to claim 8 wherein the integral image is a depth image.

11. A method according to claim 8 wherein, during the exposure step, the element additionally has an anti-halation layer on at least a portion of the front surface of the lens sheet which anti-halation layer reduces the amount of exposing light which would otherwise be reflected back toward the light sensitive layer from the front surface.

12. A method according to claim 11 wherein, during the exposure step, the majority of the area of the light sensitive layer is simultaneously exposed with light from behind the light sensitive layer.

13. A method according to claim 11 wherein the integral lens sheet is of non-laminated construction and there is no intervening support between the lens element and the anti-halation layer.

14. A method according to claim 11 wherein, during the exposure step, the light sensitive layer is simultaneously exposed to all of an integral image from behind the light sensitive layer.

15. An integral image element according to claim 1 wherein more than 80% of visible light reaching the reflective layer from in front of the layer, is reflected before penetrating the reflective layer a distance of 5 microns.

16. An integral image element according to claim 3 wherein more than 80% of visible light reaching the reflective layer from in front of the layer, is reflected before penetrating the reflective layer a distance of 5 microns.

17. A method according to claim 6 wherein more than 80% of visible light reaching the reflective layer from in front of the layer, is reflected before penetrating the reflective layer a distance of 5 microns.

18. A method according to claim 8 wherein more than 80% of visible light reaching the reflective layer from in front of the layer, is reflected before penetrating the reflective layer a distance of 5 microns.

19. A method according to claim 11 wherein more than 80% of visible light reaching the reflective layer from in front of the layer, is reflected before penetrating the reflective layer a distance of 5 microns.

* * * * *